(12) United States Patent
Edwards

(10) Patent No.: US 6,466,778 B1
(45) Date of Patent: Oct. 15, 2002

(54) MONITORING A COMMUNICATION NETWORK

(75) Inventor: Alexander F M Edwards, Ipswich (GB)

(73) Assignee: British Telecommunications public limited company, London (GB)

(*) Notice: Subject to any disclaimer, the term of this patent is extended or adjusted under 35 U.S.C. 154(b) by 0 days.

(21) Appl. No.: 09/463,298
(22) PCT Filed: Jul. 15, 1998
(86) PCT No.: PCT/GB98/02077
§ 371 (c)(1),
(2), (4) Date: Jan. 24, 2000
(87) PCT Pub. No.: WO99/05847
PCT Pub. Date: Feb. 4, 1999

Related U.S. Application Data (63) Continuation-in-part of application No. 09/008,592, filed on Jan. 16, 1998, now abandoned.

(30) Foreign Application Priority Data

Jul. 22, 1997 (GB) .............................................. 9715498

(51) Int. Cl.⁷ ................................................ H04Q 7/00
(52) U.S. Cl. ...................................... 455/410; 455/411
(58) Field of Search ................................. 455/410, 411, 455/424, 435, 425, 403, 432; 379/189, 35

(56) References Cited

U.S. PATENT DOCUMENTS

| | | | | |
|---|---|---|---|---|
| 5,335,265 A | * | 8/1994 | Cooper et al. ............... | 455/410 |
| 5,345,595 A | * | 9/1994 | Johnson et al. ............. | 455/410 |
| 5,448,760 A | * | 9/1995 | Frederick .................... | 455/410 |
| 5,555,551 A | * | 9/1996 | Rudokas et al. ............ | 455/410 |
| 5,734,977 A | * | 3/1998 | Sanmugam .................. | 455/410 |
| 5,950,121 A | * | 9/1999 | Kaminsky et al. .......... | 455/410 |

FOREIGN PATENT DOCUMENTS

| | | |
|---|---|---|
| EP | 583135 | 2/1994 |
| WO | 97 23085 | 6/1997 |

* cited by examiner

Primary Examiner—Dwayne Bost
Assistant Examiner—Joy K. Contee
(74) Attorney, Agent, or Firm—Nixon & Vanderhye P.C.

(57) ABSTRACT

Communication patterns over a network can be monitored by initially associating a mark with one or more entities in the communication network. Communications between each marked entity and at least one further entity can then be detected and a mark can be associated with each entity that communicates with each marked entity.

38 Claims, 9 Drawing Sheets

MONITORING A COMMUNICATION NETWORK

RELATED APPLICATIONS

This is a continuation-in-part of my earlier U.S. application Ser. No. 09/008,592 filed Jan. 16, 1998 (now abandoned).

BACKGROUND OF THE INVENTION

1. Field of the Invention

The present invention relates to a communication network such as a telecommunications network and more particularly to the method of and apparatus for monitoring communications and communication patterns, for example, to detect fraudulent use of a telecommunications network.

2. Related Art

There are many applications where it would be useful to be able to monitor communication patterns in a network. One such application is for detecting fraud in a telecommunications network. When fraud is perpetrated in a telecommunications network, it is often as a result of an organized ring of activity. However, the ringleader is rarely caught quickly since he will not directly make any fraudulent calls but will use accomplices to do this for him.

Currently the detection of ringleaders of such fraud groups requires a significant amount of analysis which is performed off line using large amounts of gathered data. Since this process is far from real time, the fraud ring exists for longer than is perhaps necessary.

SUMMARY OF THE INVENTION

It is an object of the present invention to provide a method of and an apparatus for monitoring communication patterns over a network and for monitoring communications over a network which can be used to detect fraudulent activity within, for example, a telecommunications network.

In accordance with a first aspect the present invention provides a method of monitoring communication patterns over a network, the method comprising:

- an initial step of associating a mark with one or more entities in the communication network;
- a detecting step of detecting communications between the or each marked entity and at least one further entity; and
- a marking step of associating a mark with each further entity that communicates with the or each marked entity.

This aspect of the present invention also provides apparatus for monitoring communication patterns over a network, the apparatus comprising:

- initial marking means for associating a mark with one or more entities of the communication network;
- detection means for detecting communications between the or each marked entity and at least one further entity; and
- marking means for associating a mark with each further entity that communicates with the or each marked entity.

This aspect of the present invention allows for the monitoring of communication patterns by detecting communications between origination and destinations e.g. communication addresses or users. This process acts as a possible fraud marking system to mark each address, node or user in the network to indicate a spread of communications. In a fraud detection system this can be used to indicate a possible site of fraudulent activity.

In one embodiment the mark associated with each marked entity has a value and marking is carried out by associating a mark value with each entity that communicates with an entity previously marked, where the mark value is calculated as a function of the mark value of the previously marked entity. In this way, the 'diffusion' of communications throughout the network from an origination point or entity can be monitored by looking at the values for each entity. Those entities which communicate with marked entities more frequently will accrue a higher value and thus the spread of communications can be monitored with a higher degree of accuracy.

One method of calculating the mark value comprises passing a fraction of the mark value of the previously marked entity to each entity that communicates with the previously marked entity.

In order to generate an average picture of communication activities between marked points in the communication network, the mark values can be made to fade with time. In a fraud detection system this enables the removal of suspicion from legitimate users who may have happened to have made a single call or infrequent calls to a suspicious user.

The mark values used can be calculated in many different ways. If a communication is detected between marked entities, the mark values associated with each of the entities can be changed as a function of the current mark values of the entities.

Points of high network activity e.g. fraudulent activity can be detected by comparing the mark values associated with the entities with a predetermined range, and identifying the or each entity having a mark value associated therewith which is outside the predetermined range. In this way, in a fraud detection system when the fraudulent activity reaches a certain level i.e. the mark values or suspicion values associated with points of the network reach a threshold, then these can be highlighted to allow intervention by operators of a fraud management system.

In a network more than one entity may be initially marked. In order to enable the communication patterns originating from each of the marked entities to be distinguished, the respective marked entities can be initially marked with respective unique marks and each entity that communicates with the or each marked entity is marked with a respective unique mark. In this way the 'diffusion' of communications throughout the network which originate from different points in the network can be distinguished.

In accordance with a second aspect of the present invention there is provided a method of monitoring communications over a network, the method comprising:

- a marking step of associating marks with entities in the communication network;
- a detecting step of detecting communications between the marked entities; and
- a generating step of generating a signal indicative of the detected communications between the marked entities.

This aspect of the present invention also provides apparatus for monitoring communications over a network, the apparatus comprising:

- marking means for associating marks with entities in the communication network;
- detection means for detecting communications between the marked entities; and
- generating means for generating a signal indicative of the detected communications between the marked entities.

In accordance with this aspect communications between marked entities are detected and in a fraud management system communications between marked entities could be indicative of fraudulent activity.

In one embodiment mark values are associated with the entities and the mark values of the entities which are in communication are detected. A value for the communication is generated based on a function of the detected mark values for the communication. The value for the communication can then be compared with a predetermined range and it can be identified whether the value for the communication is outside the predetermined range. In this way, in a fraud detection system, communications between suspicious points in the network can be monitored and if the points in the network are highly suspicious, the communication will also be marked as being highly suspicious and can be brought to the attention of an operator of a fraud management system.

In the communication network in accordance with the present invention entities can include communication nodes as communication originations and/or destinations, e.g. in a telecommunication network the communication nodes comprise telephone numbers. Also, the entities can include purported users who are identified by user related code as communication origination, e.g. in a telecommunications network an entity can comprise a charge card number or a personal number. The user related code may be used at any communication node and since charge cards and personal numbers are particularly prone to fraud, the ability to associate suspicion with such a user related code is important. It is not sufficient to merely associate suspicion with communication nodes since charge cards and personal codes may be used on any communication node for making a fraudulent communication.

BRIEF DESCRIPTION OF THE DRAWINGS

Embodiments of the present invention will now be described with reference to the accompanying drawings, in which.

DETAILED DESCRIPTION OF EXEMPLARY EMBODIMENTS

Figure 1:
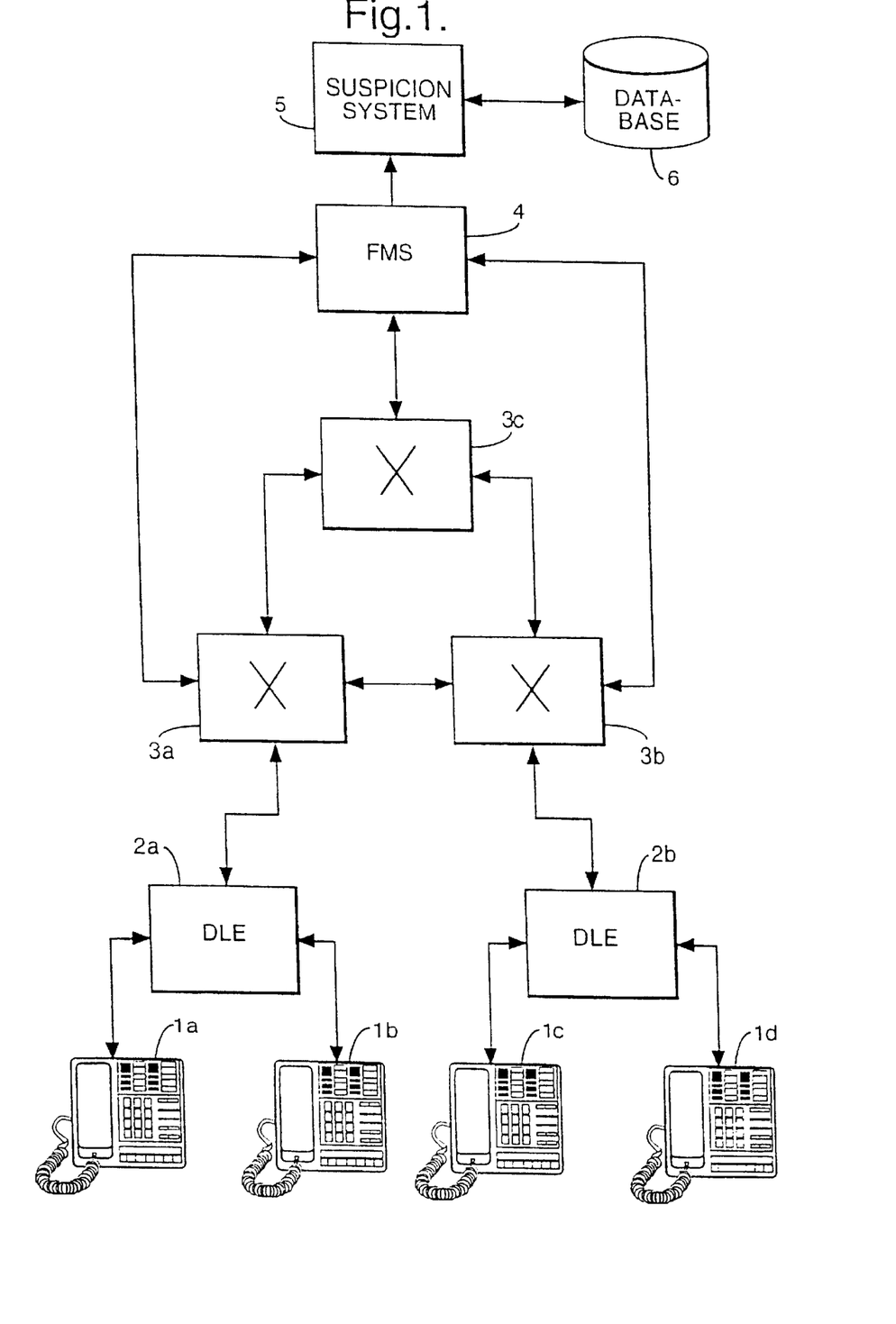
FIG. 1 is a schematic drawing of a telecommunications network employing a suspicion system in accordance with an embodiment of the present invention.

Referring now to FIG. 1, there is illustrated schematically a telecommunications network utilizing the suspicion system in accordance with a known embodiment of the present invention to monitor fraudulent activity. Telephone handsets 1a, 1b, 1c and 1d make calls which are routed via the Digital Local Exchanges (DLE) 2a and 2b either to other local handsets 1a, 1b, 1c and 1d or to a network of switches 3a, 3b and 3c. A Fraud Management System (FMS) 4 monitors communications over the network of switches 3a, 3b and 3c in order to detect any fraudulent activity. Although in this embodiment the fraud management system monitors fraud at the switches, also or alternatively fraud could be monitored at the digital local exchanges.

The fraud management system 4 can comprise any known fraud management system such as one which incorporates rule based fraud detection. Such types of fraud management systems are well known and are outside the scope of the present invention. The monitoring of the communications by the fraud management system are passed on to a suspicion system 5 which has a suspicion database 6 associated therewith.

Figure 2:
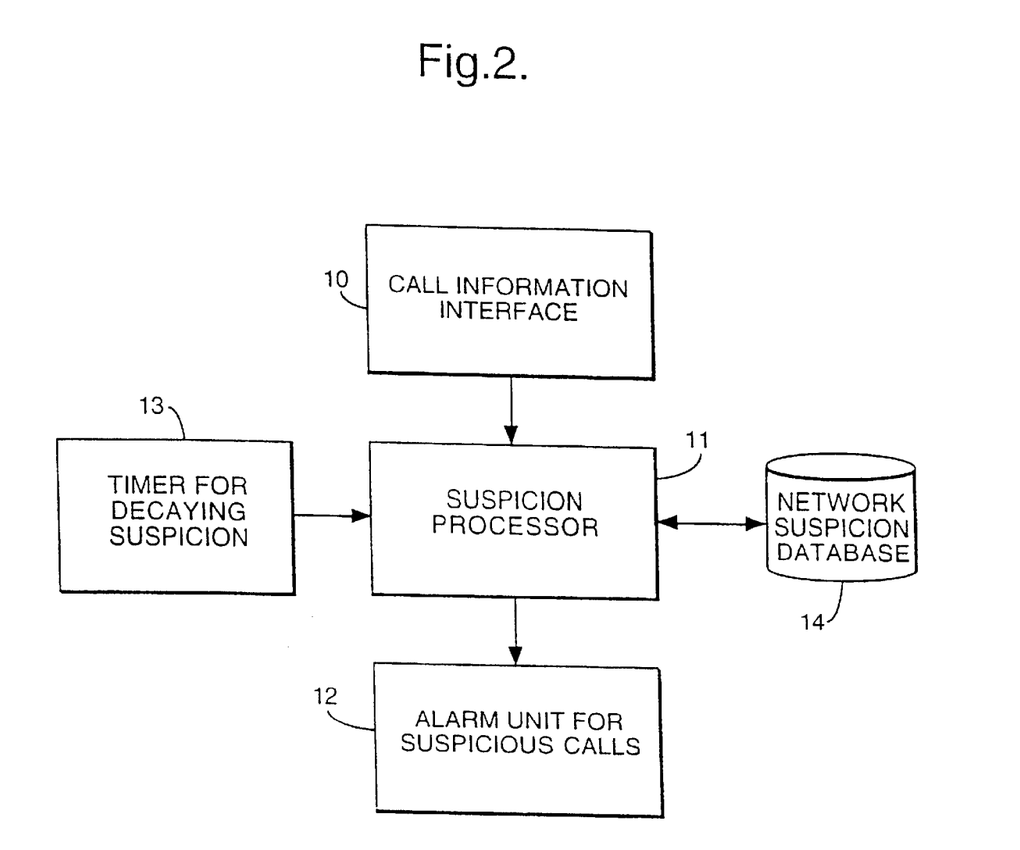
FIG. 2 is a schematic diagram of the suspicion system of FIG. 1.

FIG. 2 illustrates in more detail the suspicion system 5 and database 6 of FIG. 1. A call information interface 10 provides the suspicion processor 11 with call information from the network of switches 3a, 3b and 3c. The suspicion processor 11 calculates a suspicion value for each point in the network in accordance with the call information and the calculated suspicion values for the points in the network are stored in the network suspicion database 14. The suspicion processor 11 calculates a suspicion value for calls between suspicious points in the network and if a call has a suspicion value higher than a threshold, the suspicion processor 11 can cause the alarm unit 12 to warn an operator that a suspicious call is being made. A timer 13 is provided for decaying or fading the suspicion values for the points in the network in order to remove suspicion from the legitimate customers over a predetermined period of time.

Figure 3:
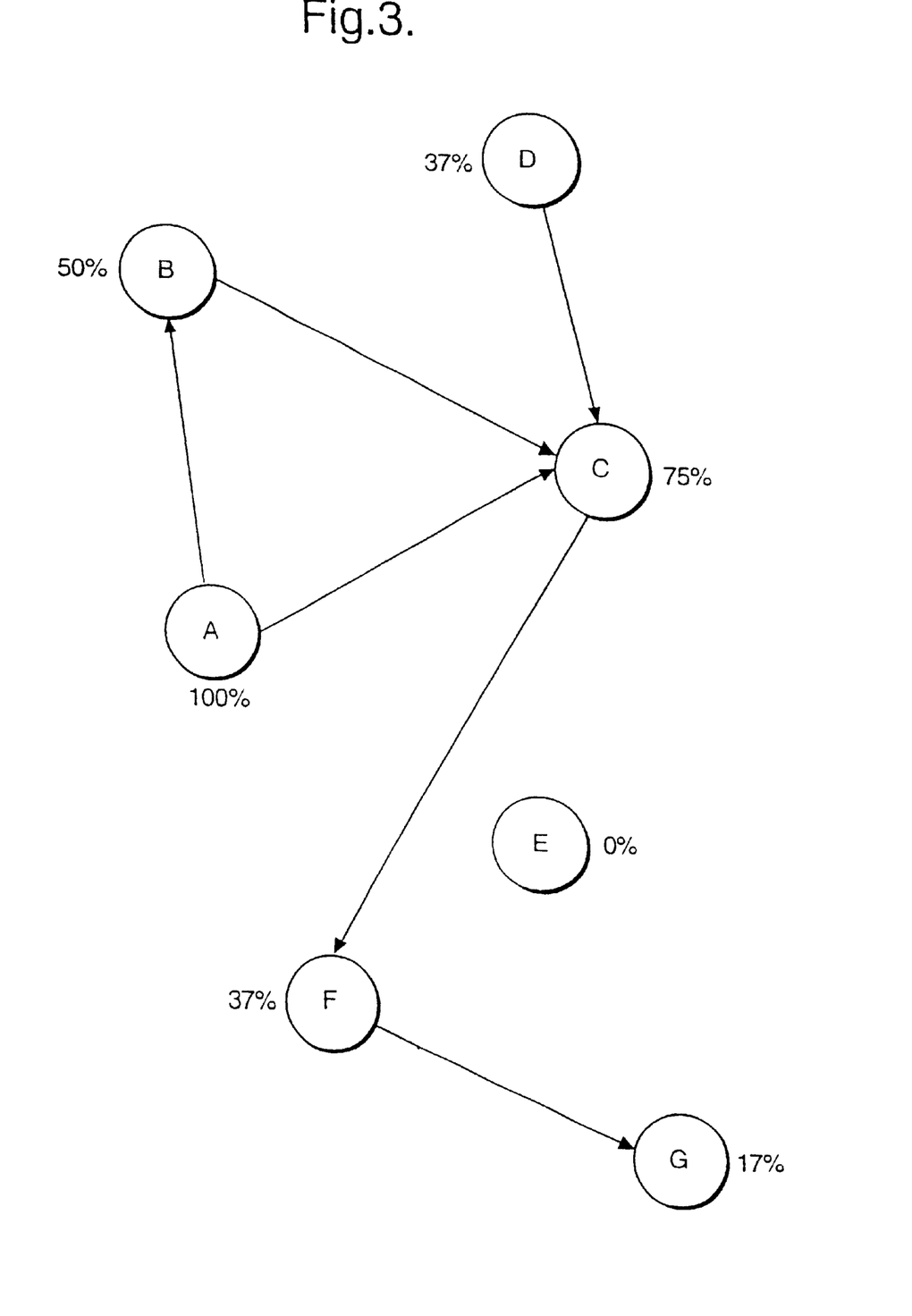
FIG. 3 is a schematic drawing illustrating the 'diffusion' of suspicion throughout a network.

FIG. 3 illustrates the principles of the passage of suspicion over a network of nodes A to B. Node A is initially marked as suspicious and is assigned a suspicion value of 100%. A call is made to node B which is therefore assigned a suspicion value of 50%. Node B then makes a call to node C and node C is thus assigned a suspicion value of 25%. Subsequently node A makes a call to node C and thus the suspicion value of node C increases to 75%. Node D makes a call to node C and is thus assigned a suspicion value of 37%. Node C then makes a call to node F and node F is assigned a suspicion value of 37%. Node F then makes a call to node G and node G is assigned a suspicion value of 17%. Since node E has had no contact with any of the nodes A–D, F or G, there is no suspicion value assigned to it.

It can thus been seen from FIG. 3 that a communication pattern of the network is monitored and a pattern of fraudulent activity can be detected.

It should be noted whilst specific values and fractions for the passage of suspicion values are used in order to illustrate the principles with reference to FIG. 3, any suitable method can be used to calculate the passage of suspicion values over the network.

In accordance with the principles of FIG. 3, initially a fraudster's telephone activity is registered as unusual on a fraud detection system. This may result in a number of alarms being raised, and possibly the user's number being barred from further usage. When the call has been registered as being unusual a suspicion value may be associated with the user in a database which contains lists of suspicious telephone numbers together with their associated suspicion value and the telephone owner. Alternatively, this could be integrated into the normal billing database, although transaction speed would be reduced. Thus, the system can operate off line although to improve the fraud detection rate it is preferred to operate the system on line. The suspicion value is likely to be based on the severity of the recorded incident, for example, a call of slightly long duration would have a suspicion which is a lot lower than a call to a known fraudulent location which would in turn have a lower suspicion than a suspicion based on a telephone number which has been barred recently.

Once a suspicion has been recorded for a user, there are a number of opportunities for using this information proactively.

If a call is made from a telephone which has a suspicion associated with it, the telephone number that is dialed can also have a suspicion value associated with it. The suspicion value associated with this new number will have a suspicion value which is lower than the telephone making the call. If the dialed number already has a suspicion rating, the new and old ratings will be combined with an appropriate function. Such a function may be to add the two values together to increase the rating for that telephone, take the highest value of the two, or take an average of the two for example. This latter approach is illustrated in FIG. 3.

Also, a suspicion rating for the actual call being made can be determined. For example if a call is made from one telephone number to another telephone number and both have suspicion values associated therewith, the telephone calls may be very suspicious for fraud related purposes.

An extension to this idea is that a call made from any number to a number which has a suspicion value will cause the number calling to also be made suspicious i.e. to be assigned a suspicion value (as the node D has acquired a suspicion value for calling the node C in FIG. 3). In the arrangement of FIG. 3 a single suspicion value is used for both ingoing and outgoing calls. However, two different values may be used one for outgoing calls and the other for incoming calls.

In addition to maintaining a suspicion value, the number of suspicious calls made in total or the number of outgoing and incoming suspicious calls can be counted.

To provide the most complete information a 'pointer' to the call record which details the call made can be stored for each suspicious call. In this way a trace can be performed of where the fraud chain and gang network exists.

Figure 4A:
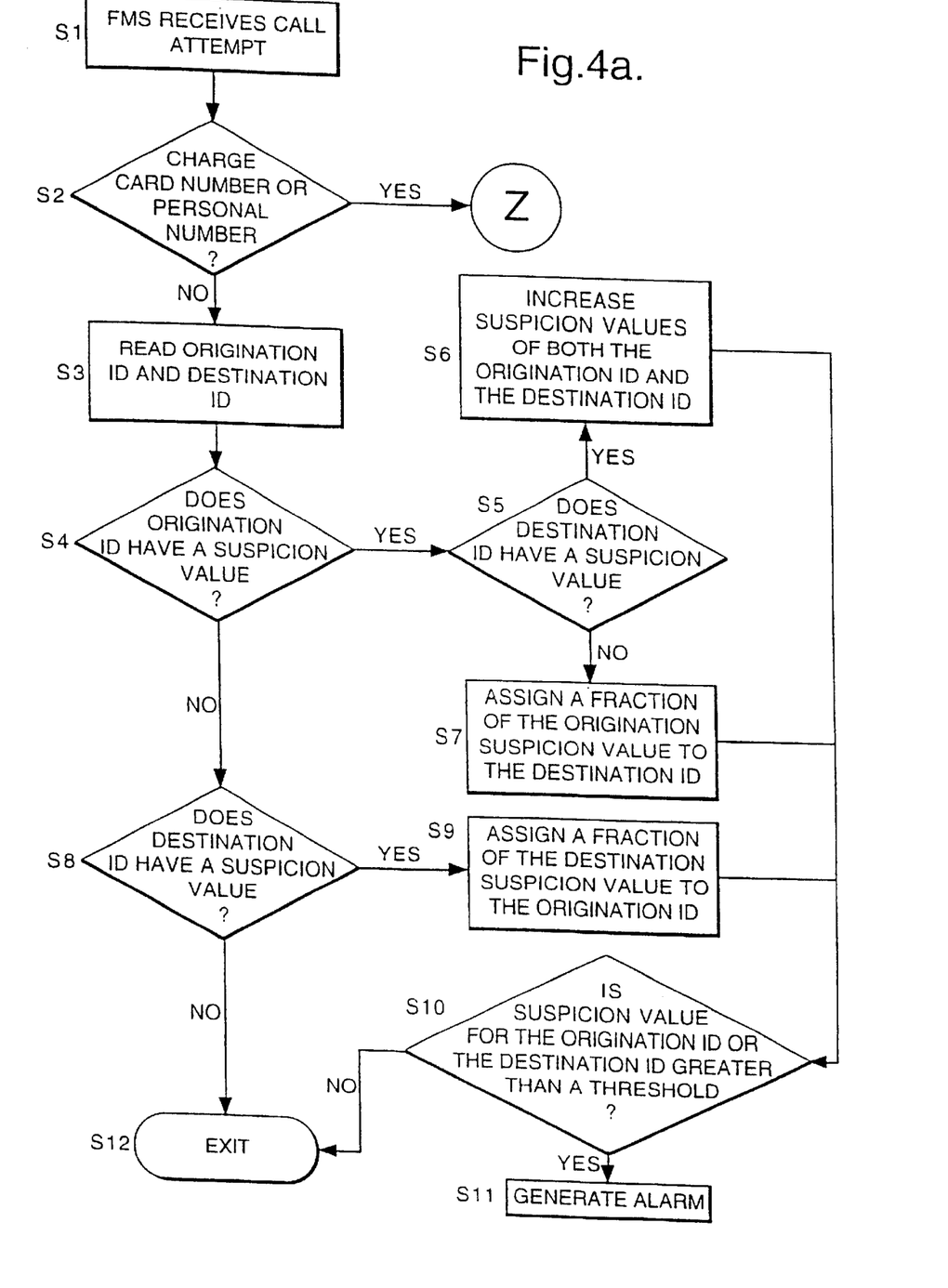
FIGS. 4a and 4b comprise a flow diagram illustrating a method of monitoring fraudulent activity in a telecommunication system in accordance with one embodiment of the present invention.
Figure 4B:
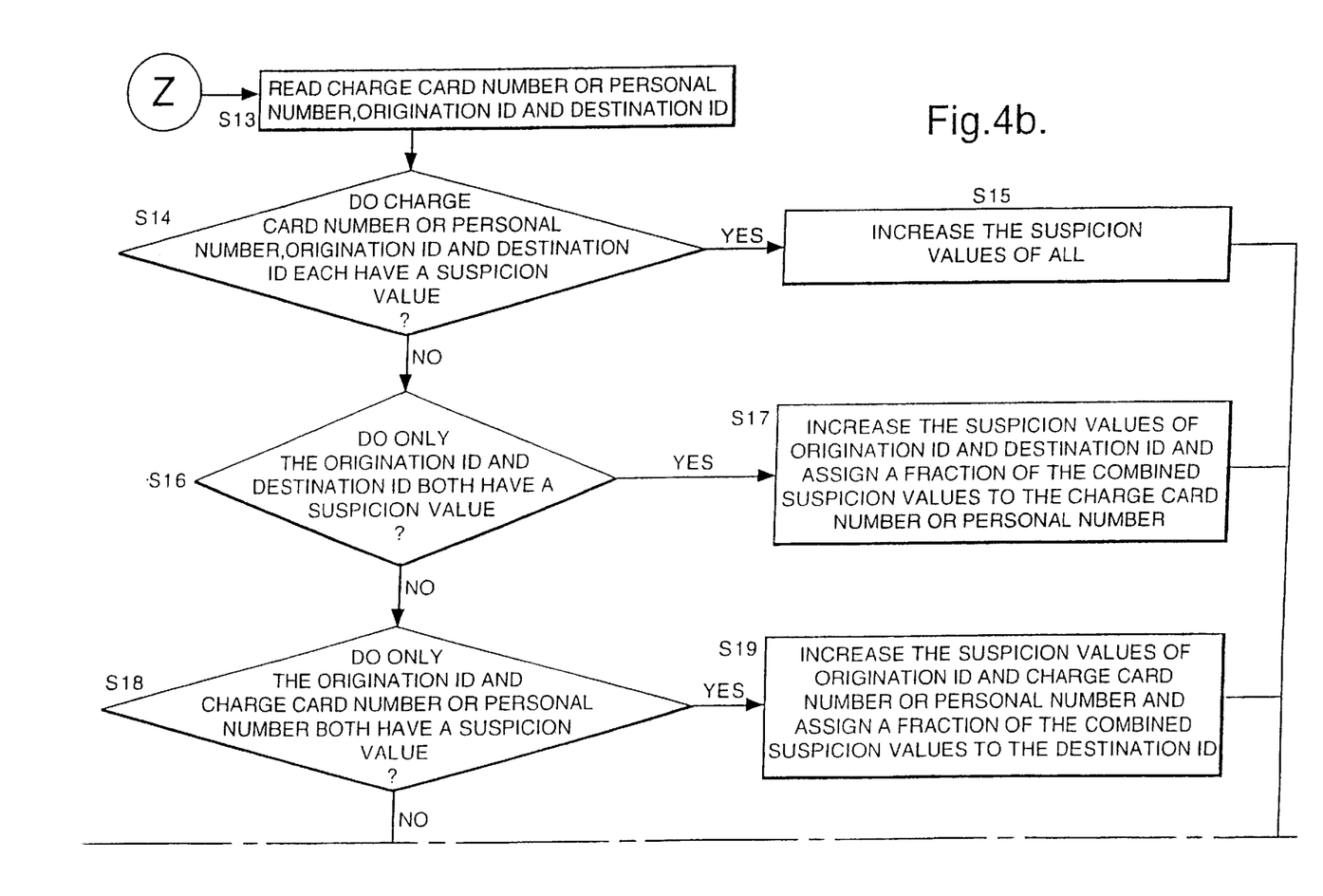

FIGS. 4a and 4b are a flow diagram illustrating the operation of an embodiment of the present invention in a telecommunications network wherein telephone numbers comprise the origination ID and destination ID and user related code in the form of a charge card number or personal number can be used by a user to make a call from any origination ID. Since charge card numbers and personal numbers are particularly susceptible to fraud in view of their portability within a telecommunications network and the ease with which they can be fraudulently obtained, it is important to be able to assign suspicion values not only to actual physical nodes i.e. numbers within the telecommunication network, but also to a user related code such as the charge card number or personal numbers or any other entity which identifies an origination or destination within the network.

In step S1 the fraud management system receives a call attempt. In step S2 it is determined whether there is a charge card number or personal number associated with the call attempt. If there is no number associated with the call in step S3 the origination ID and destination ID are obtained from the call information and in step S4 it is determined whether the origination ID has a suspicion value associated therewith. If the origination ID has a suspicion value associated therewith, in step S5 it is determined whether the destination ID has a suspicion value associated therewith. If both the origination and destination IDs have a suspicion value associated therewith in step S6 the suspicion values of both the origination and the destination IDs are increased. If only the origination ID has a suspicion value associated therewith, in step S7 a fraction of the origination suspicion value is assigned to be associated with the destination ID. If in step S4 it is determined that the origination ID does not have a suspicion value associated therewith, in step S8 it is determined whether the destination ID has a suspicion value associated therewith and if so in step S9 a fraction of the destination ID suspicion value is assigned to be associated with the origination ID. When the suspicion value associated with the destination ID and/or the origination ID have been changed in steps S6, S7 or S9, in step S10 it is then determined whether the suspicion value for the origination ID or the destination ID is greater than a threshold. If it is greater than the threshold, in step S11 an alarm can be generated in such a manner as to bring to the attention of an operator of a fraud management system the possibility of a high degree of fraudulent activity taking place. If in step S10 the threshold is not exceeded or in step S8 there is no suspicion value associated with the destination or the origination IDs the process terminates in step S12.

If in step S2 it is determined that the call attempt has a charge card number or personal number associated therewith, in step S13 the charge card number or personal number, origination ID and destination ID are read and in step S14 it is determined whether the charge card number or personal number, origination ID, and destination ID each have a suspicion value. If they do, in step S15 the suspicion values of all of these are increased. If not, in step S16 it is determined whether only the origination ID and the destination ID both have a suspicion value. If they do, in step S17 the suspicion value of the origination ID and the destination ID are increased and a fraction of the combined suspicion of these is assigned to the charge card number or the personal number. If the origination ID and the destination ID do not both have a suspicion value in step S18 it is determined whether the origination ID and the charge card number or personal number only both have a suspicion value. If so in step S19 the suspicion value of the origination ID and the charge card number or personal number are increased and a fraction of the combined suspicion value is assigned to the destination ID. If in step S18 it is determined that the origination ID and the charge card number or personal number do not both have a suspicion value, in step S20 it is determined whether only the destination ID and the charge card number or personal number both have a suspicion value. If so in step S21 the suspicion value on the destination ID and the charge card number or personal number are increased and a fraction of the combined suspicion values is assigned to the origination ID. If in step S20 it is determined that only the destination ID and the charge card number or personal number do not both have a suspicion value, in step S22 it is determined whether only one of the origination ID, the destination ID or the charge card number or personal number have a suspicion value. If they do, in step S23 a fraction of the suspicion value is assigned to the others which do not have a suspicion value. If in step S15, S17, S19, S21 or S23 the suspicion value has changed, in step S24 it is determined whether the suspicion value for the charge card number or personal number, the origination ID or the destination ID is greater than the threshold. If so, in step S25 an alarm is generated. If not in step S26 the process is terminated. Also, if it is determined in steps S14, S16, S18, S20 and S22 that neither the charge card number or personal number, the origination ID or the destination ID have a suspicion value associated therewith, the process is terminated in step S26.

Thus in this embodiment suspicion values are spread throughout the telecommunications network in accordance with communications made between suspicious points i.e. telephone numbers and/or personal numbers in the network. If a suspicion value for a point in the network moves outside a predetermined range i.e. exceeds a threshold, this can be brought to the attention of an operator of a fraud management system to allow intervention e.g. by preventing further calls to and/or from that point in the network. In this way a call can be barred before the call is completed i.e. as soon as the call attempt is received thus allowing the provision of an automatic fraud prevention system.

Figure 5:
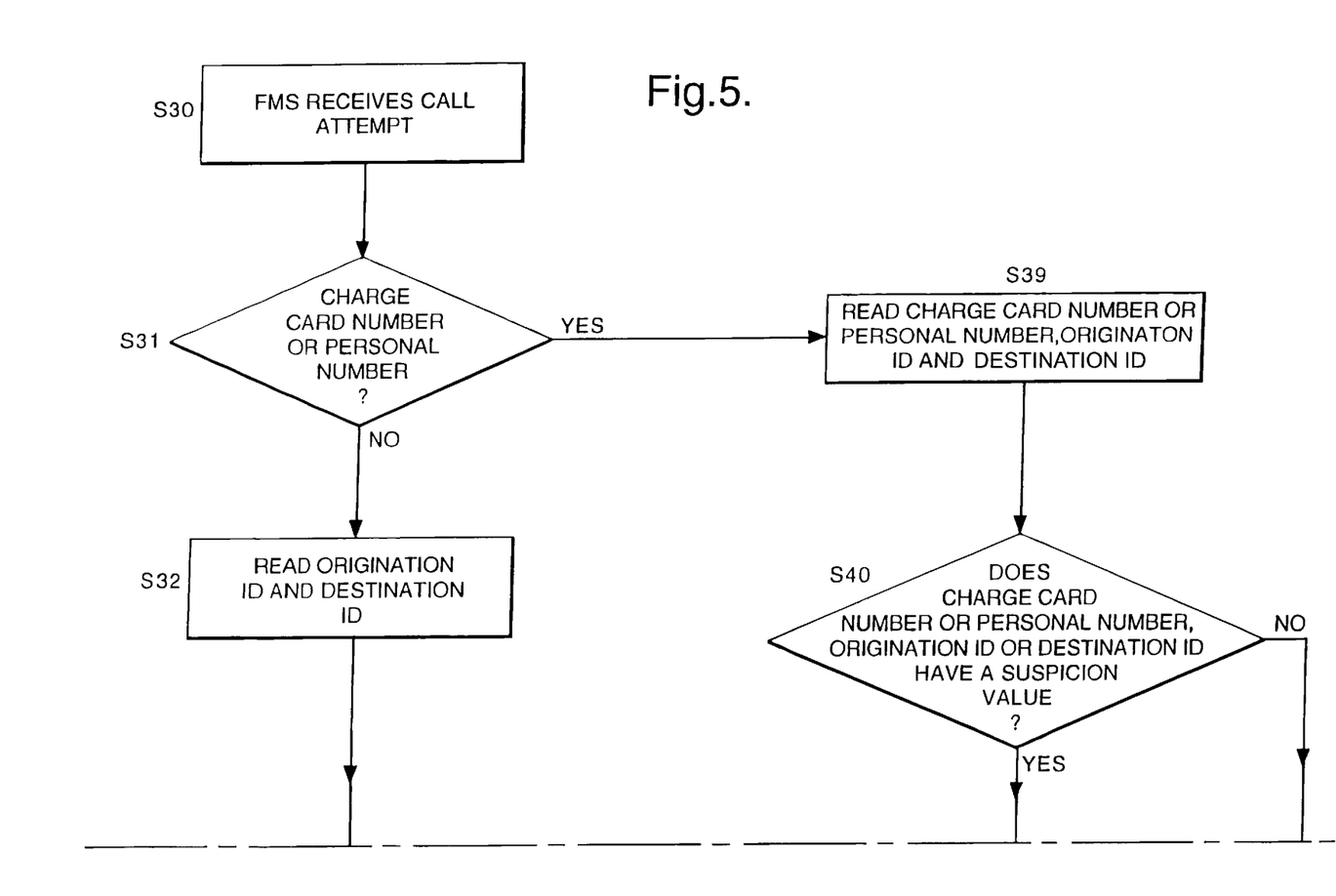
FIG. 5 is a flow diagram illustrating a method of monitoring fraudulent communications in accordance with an embodiment of the present invention.

FIG. 5 is a flow diagram of the operation of a system for detecting fraudulent calls. In step S30 a fraud management system receives a call attempt. In step S31 it is determined whether there is a charge card number or personal number associated with the call attempt. If not in step S32 the origination ID and the destination ID of the call are determined and in step S33 it is determined whether the origination ID or the destination ID have a suspicion value associated therewith. If there is no suspicion value associated with the origination ID or the destination ID the process terminates in step S37. If there is a suspicion value associated with the origination ID or the destination ID in step S34 a suspicion value is assigned to the call based on the suspicion values of the origination ID and/or the destination ID. In step S35 it is then determined whether the suspicion value for the call is above the threshold. If not the process terminates in step S37. If the suspicion value for the call is above the threshold in step S36 an alarm is generated. This can either allow the operator of a fraud management system to stop the call manually or to look more carefully at the activity, or the call could be automatically prevented.

If in step S31 it is determined that there is a charge card member or personal number associated with the call, in step S39 the charge card number or personal number, origination ID and destination ID are read and in step S40 it is determined whether the charge card number or personal number, origination ID or destination ID have a suspicion value associated therewith. If not the process terminates in step S37. If however they do have a suspicion value, in step S41 a suspicion value is assigned to the call based on the suspicion values of the charge card number or personal number, the origination ID and/or the destination ID. In step S42 it is determined whether the suspicion value for the call is above the threshold. If not the process terminates in step S37. If the suspicion value for the call is above the threshold an alarm is generated in step S36 in a manner as described hereinabove.

This method allows for the manual or automatic control of calls in a telecommunications network. When calls are made between highly suspicious points in the network, the call made will thus acquire a suspicion value which can allow the call to be barred if necessary.

Figure 6:
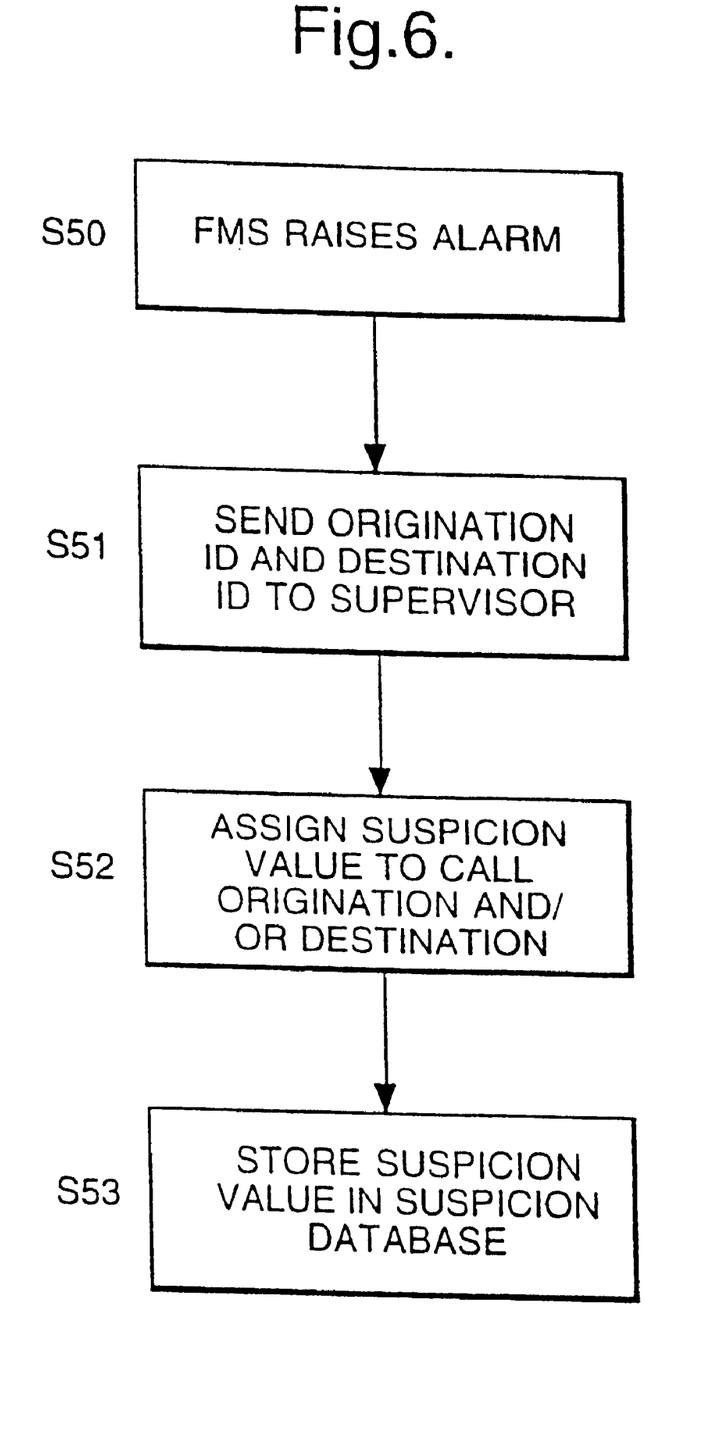
FIG. 6 is a flow diagram illustrating the automatic assignment of suspicion to an entity in a communication network.

FIG. 6 is a flow diagram of a method of initially automatically assigning a suspicion value to a point in the network based on previously determined fraudulent activity. In step S50 the fraud management system raises an alarm for a suspicious call. In step S51 the origination ID and destination ID are sent to the fraud management system supervisor. In step S52 the supervisor can assign a suspicion value to the call origination, and/or destination and in step S53 the suspicion value is stored in the suspicion database for the call origination and/or destination. The call origination and/ or destination i.e. the entity in the communications network can comprise any information identifying a communication location, communication node, or a user e.g. telephone number, personal number or charge card number. Thus when calls are subsequently made from or to the origination ID with the suspicion value, suspicion values will permeate throughout the network in accordance with the calls made between suspicious points as described hereinabove.

Although in the embodiments described hereinabove communications have been described as being directly from an origination to a destination i.e. direct communications between single entities in the telecommunications network, the present invention is also applicable to more complex methods of communications. For example, a call may be diverted. In such an arrangement both of the destination entities i.e. nodes can be marked. Also, for personal numbers where a person has a single telephone number and calls are routed to telephone numbers in dependence upon where the user is, both the personal number and the ultimate destination telephone number can be marked. The present invention is also applicable to identify fraud in a telecommunications network where there are more than two participants e.g. in a three way conversion or when a conference call has been set up.

Although the present invention as has been described hereinabove with reference to a telecommunications network, the present invention is applicable to any network to enable the monitoring of communications between marked nodes and to build up a pattern of communications from one or more marked nodes or points in the network. This simple labelling technique can provide useful information for the management or control of any kind of network such as a network of computers. The information can for instance be used to obtain a pattern of network traffic originating from a point in order to design efficient network connections.

Although the present invention has been described hereinabove with reference to specific embodiments, it will be apparent to a skilled person in the art that modifications are possible within the scope of the present invention as defined by the appended claims.

What is claimed is:

1. A method of monitoring communication patterns over a network, the method comprising:
    an initial step of associating a mark having a numeric value with one or more entities in the communication network;
    a detecting step of detecting communications between the or each marked entity and at least one further entity; and
    a marking step of associating a respective derived mark with each further entity that communicates with the or each marked entity, the derived mark having a numeric value calculated from, but different than, the numeric value associated with the or each previously marked entity with which the further entity communicates.

2. A method according to claim 1 wherein said detecting step and said marking step are carried out for a plurality of communications, the respective derived marks being calculated from a combination of the previous value of the desired mark and the numeric value of the or each previously marked entity with which the further entity communicates.

3. A method according to claim 1 wherein said marking step comprises passing a fraction of the mark value of the previously marked entity to each entity that communicates with the previously marked entity.

4. A method according to claim 1 including a reduction step of reducing the mark values with time.

5. A method according to claim 1 wherein if said detecting step detects a communication between marked entities, said marking step includes the step of changing the mark values associated with each of the entities as a function of the mark values associated with the entities.

6. A method according to claim 1 including the step of identifying communications between marked entities.

7. A method according to claim 6 including the steps of identifying communications between marked entries, and assigning a value to the communication as a function of the mark values of the marked entities in communication.

8. A method according to claim 7 including the steps of comparing the value of the communication with a predetermined range, and generating a signal if the value is outside the predetermined range.

9. A method according to claim 1 including the steps of comparing the marks values associated with the entities with a predetermined range, and identifying the or each entity having a mark value associated therewith which is outside the predetermined range.

10. A method according to claim 1 wherein the entities of the communication network include communication nodes as communication originations and/or destinations.

11. A method according to claim 10 wherein the entities of the communication network include purported users identified by user related code as communication originations and/or destinations.

12. A method according to claim 1 wherein in said initial step the one or more entities in the communication network are also marked with respective unique identifiers, and in said marking step each entity that communicates with the or each marked entity is marked with the respective unique identifiers.

13. A method according to claim 1 including the step of storing the identities of each entity in each detected communication with a marked entity.

14. A method according to claim 1 including the step of storing information on each detected communication with a marked entity.

15. A method according to claim 1 including the preliminary step of determining which entity in the communication network is to be marked in said initial step based on previous communications by said entities.

16. A method of monitoring communications over a network, the method comprising:
   a marking step of associating marks with entities in the communication network;
   a detecting step of detecting communications between the marked entities; and
   a generating step of generating a signal indicative of the detected communications between the marked entities;
   wherein said marking step comprises associating numeric mark values with said entities, said detecting step includes detecting the mark values of the entities in communication, and said generating step comprises generating a numeric value for the communication based on a function of the detected mark values for the communication, the generated numeric value being different than the numeric mark values.

17. A method according to claim 16 including the steps of comparing the value for the communication and a predetermined range, and identifying the or each communication having a value outside said predetermined range.

18. A method according to claim 16 wherein the entities of the communication network include communication nodes as communication originations and/or destinations.

19. A method according to claim 18 wherein the entities of the communication network include purported users identified by user related code as communication originations and/or destinations.

20. Apparatus for monitoring communication patterns over a network, the apparatus comprising:
   initial marking means for associating a mark having a numeric value with one or more entities of the communication network;
   detection means for detecting communications between the or each marked entity and at least one further entity; and
   marking means for associating a respectively derived mark with each further entity that communicates with the or each marked entity, the derived mark having a numeric value calculated from, but different than, the numeric value associated with the or each previously marked entity with which the further entity communicates.

21. Apparatus according to claim 20 wherein said detection means and said marking means are adapted to detect and mark said entities for a plurality of communications, the respective derived marks being calculated from a combination of the previous value of the desired mark and the numeric value of the or each previously marked entity with which the further entity communicates.

22. Apparatus according to claim 20 wherein said marking means is adapted to pass a fraction of the mark value of the previously marked entity to each entity that communicates with the previously marked entity.

23. Apparatus according to claim 20 including means for reducing the mark values of time.

24. Apparatus according to claim 20 wherein if said detection means detects a communication between marked entities, said marking means is adapted to change the mark values associated with each of the entities as a function of the mark values associated with the entities.

25. Apparatus according to claim 20 including means for identifying communications between marked entities.

26. Apparatus according to claim 25 including means for identifying communications between marked entities, and means for assigning a value to the identified communications as a function of the marked values of the marked entities in the communication.

27. Apparatus according to claim 26 including means for comparing the value of the communication with a predetermined range, and means for generating a signal if the value is outside the predetermined range.

28. Apparatus according to claim 20 including means for comparing the mark values associated with the entities with a predetermined range, and means for identifying the or each entity having a mark value associated therewith which is outside the predetermined range.

29. Apparatus according to claim 20 wherein the entities of the communication network include communication nodes and communication originations and/or destinations.

30. Apparatus according to claim 25 wherein the entities of the communication network include purported users identified by user related codes as communication originations and/or destinations.

31. Apparatus according to claim 20 wherein said initial marking means is adapted to also mark the one or more entities in the communication network with respective unique identifiers, and said marking means is adapted to mark each entity that communicates with the or each marked entity with the respective unique identifier.

32. Apparatus according to claim 20 including means for storing the identities of each entity in each detected communication with a marked entity.

33. Apparatus according to claim 20 including means for storing information on each detected communication with a marked entity.

34. Apparatus according to claim 20 including means for determining which entity in the communication network is to be marked by said initial marking means based on previous communications by said entities.

35. Apparatus for monitoring communications over a network, the apparatus comprising:

marking means for associating marks with entities in the communication network;

detection means for detecting communications between the marked entities; and generating means for generating a signal indicative of the detected communications between the marked entities;

wherein said marking means is adapted to associate numeric mark values to said entities, said detection means is adapted to detect the mark values of the entities in communication, and said generating means is adapted to generate a numeric value for the communication based on a function of the detected mark values for the communication, the generated numeric value being different than the numeric mark values.

36. Apparatus according to claim 35 including means for comparing the value for the communication and a predetermined range, and means for identifying the or each communication having a value outside said predetermined range.

37. Apparatus according to claim 31 wherein the entities of the communication network include communication nodes as communication originations and/or destinations.

38. Apparatus according to claim 37 wherein the entities of the communication network include purported users identified by user related code as communication originations and/or destinations.

* * * * *